Nov. 13, 1956 L. B. NEIGHBOUR ET AL 2,770,375
HOISTING APPARATUS FOR ELEVATING AND DUMPING VEHICLES
Filed May 28, 1949 2 Sheets-Sheet 1
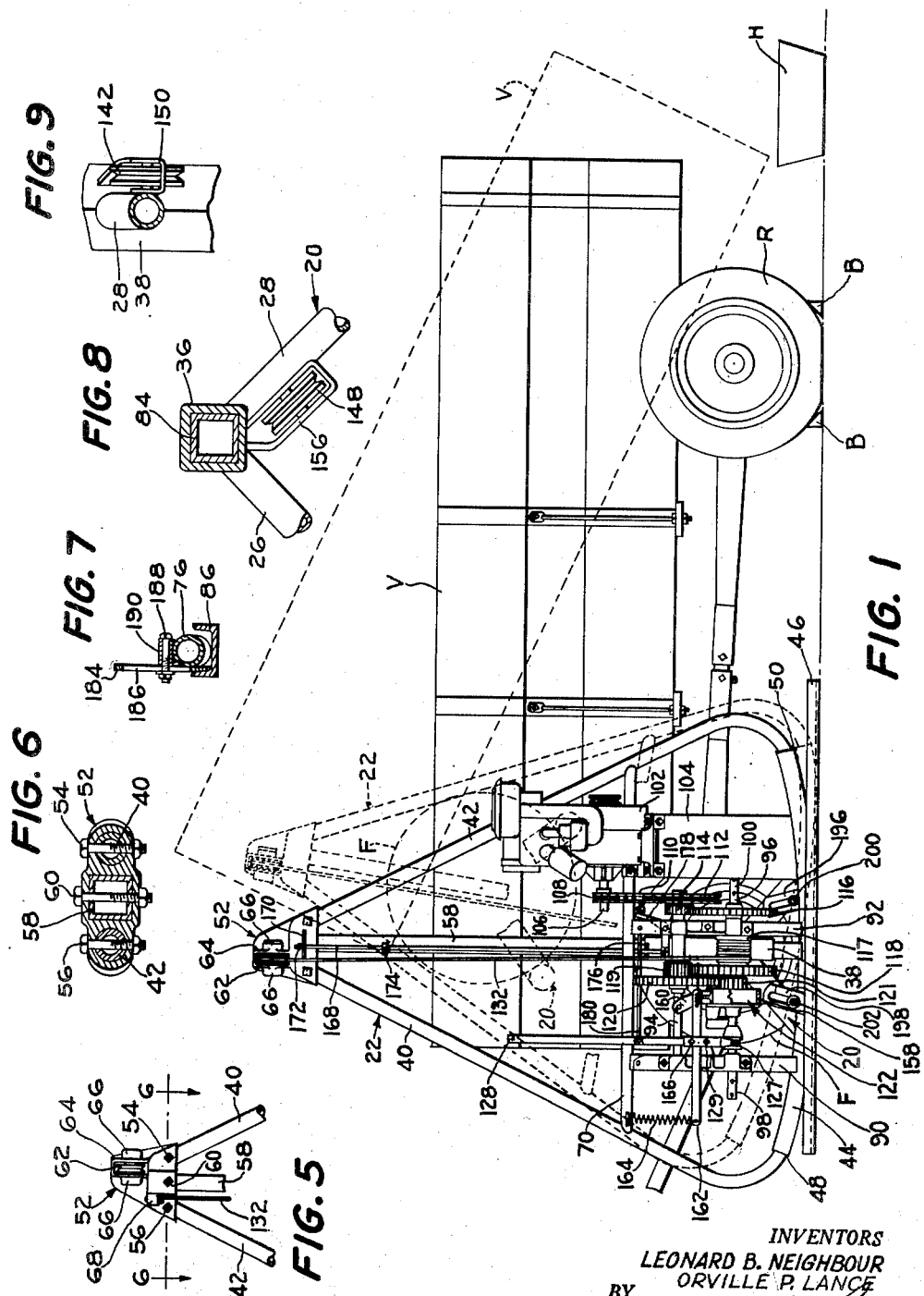
INVENTORS
LEONARD B. NEIGHBOUR
ORVILLE P. LANCE
BY
ATTORNEYS Nov. 13, 1956  L. B. NEIGHBOUR ET AL  2,770,375
HOISTING APPARATUS FOR ELEVATING AND DUMPING VEHICLES
Filed May 28, 1949  2 Sheets-Sheet 2
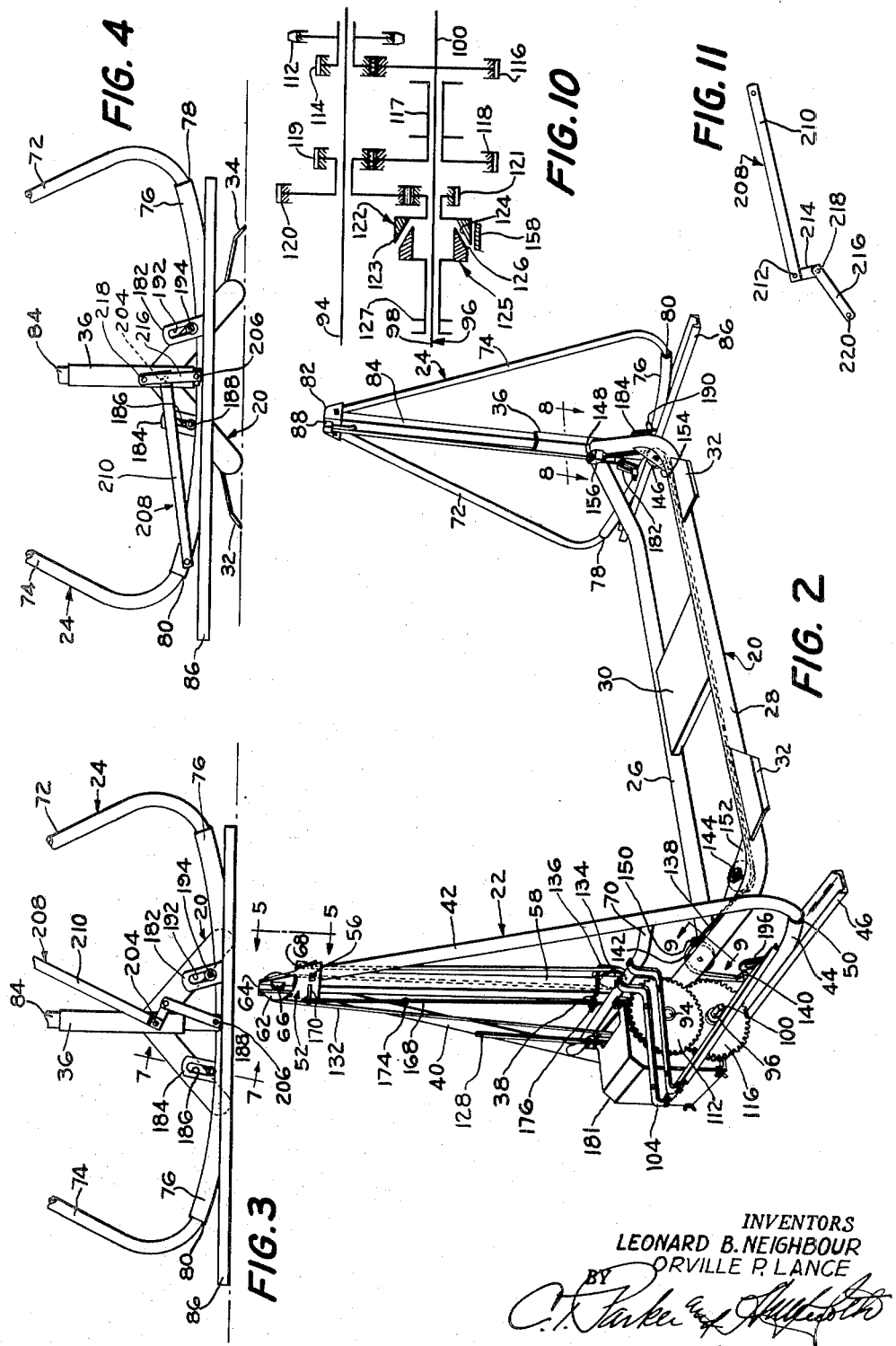
INVENTORS
LEONARD B. NEIGHBOUR
ORVILLE P. LANCE
BY
ATTORNEYS

United States Patent Office 2,770,375
Patented Nov. 13, 1956

2,770,375

HOISTING APPARATUS FOR ELEVATING AND DUMPING VEHICLES

Leonard B. Neighbour, Moline, Ill., and Orville P. Lance, Davenport, Iowa, assignors to Deere & Company, Moline, Ill., a corporation of Illinois Application May 28, 1949, Serial No. 95,906

13 Claims. (Cl. 214—46.34)

This invention relates to a hoisting apparatus and more particularly to such apparatus as used for bodily elevating vehicles or the like so that the contents thereof may be dumped.

A specific use for a hoisting apparatus of the type referred to generally above is on farms where such apparatus is utilized in the handling of grain, for example. Ordinarily, the grain is loaded into wagons and trailers which are hauled an appreciable distance to a storage place for the grain. Such storage place is usually in the form of a bin which has an inlet or filling opening at a considerable elevation above the ground, and the grain must be elevated from the wagon or trailer to the upper portion of the bin. One conventional and convenient method for accomplishing the elevation is to utilize an elevator having an inclined conveyor and a receiving hopper, the latter normally resting on the ground in position to receive the grain from the wagon or trailer. Hoisting devices have heretofore been known which will elevate or tilt the wagon so that the grain therein is discharged into the hopper, whence it may be conveyed upwardly into the storage bin.

The type of arrangement generally discussed above is relatively popular and is preferable to a system in which each trailer or wagon is provided with its own dumping mechanism, primarily because the latter system involves considerable expense inasmuch as several wagons or trailers must be provided, and it is therefore more desirable to provide a single hoisting or elevating apparatus which will tip the wagon or trailer bodily.

In a normal series of operations for accomplishing the unloading and elevating of grain, wagons or trailers are filled with grain and are drawn to the elevating point by tractors or other draft vehicles. At the elevating point there is provided a hoisting apparatus which is conventionally arranged to receive the front wheels of the wagon or trailer. The tractor or other draft vehicle is disconnected and the hoisting apparatus is operated to raise the front end of the wagon. Since the rear end of the wagon must discharge into the elevator hopper, it is important to prevent forward or rearward rolling of the wagon relative to the hopper. To this end, the hoisting apparatus must include provision for raising the front end of the trailer or wagon through an arc. In a so-called overhead hoist, the wagon is suspended and will naturally follow the required arc if the rear wheels are blocked. However, such overhead hoists are normally permanent installations and the cost thereof is considerably higher than a portable hoist.

Portable hoists of many types heretofore known include means in the form of a platform onto which the front wheels of the wagon may be driven. This platform may be raised to tip the wagon and inclined guide means are provided for tilting the wagon generally through the required arc. The primary disadvantage of such portable hoist is that the wagon or trailer must always be driven in from the same side; that is, the side toward which the guide means incline. This structural disadvantage limits somewhat the use of the hoisting device.

According to the present invention, the portable hoisting device includes provision for shifting of the elevating means so that the wagon may be accommodated at either side of the hoist. This result is accomplished by providing supporting means having under surfaces in the form of rockers so that, as the wagon is raised, the hoist may rock in the required direction. Since the rocking means is symmetrical at each side, the wagon may be accommodated at either side of the hoist and may be readily raised and lowered without causing displacement of the discharge end of the wagon or trailer relative to the elevator hopper.

The invention contemplates and has for another important object the provision of an improved portable hoist that may be readily transported and to this end it utilizes a platform structure as skid means and includes provision for elevating the supporting structure so that the latter is clear of the ground and is not an obstruction to transport of the apparatus.

A further object of the invention resides in the provision of structure in which the ends or supporting elements of the hoist are adequately braced to the platform structure without complicated cross bracing, thereby leaving the platform clear so that the wagon or trailer may be readily driven onto and off of the platform. In this respect, the interconnection between the platform structure and each of the supporting end elements includes provision for stabilizing the structure and eliminating twisting of the related components about vertical axes.

Still further objects of the invention include the provision of: Improved means for hoisting the platform structure on the end or brace elements; means for equalizing the raising and lowering of the platform structure so that power means need be provided at only one end; the utilization of cable means that are conveniently and compactly arranged with respect to the supporting structure, in some instances passing through tubular elements of the structure; improved means for utilizing the hoisting means as part of the means for raising the end elements with respect to the platform so that the platform may be used as skid means for transporting the apparatus; and a portable hoisting apparatus of simple and inexpensive construction and one that may be readily used with maximum efficiency.

The foregoing and other important objects and desirable features of the invention will become apparent to those versed in the art as a detailed disclosure thereof is made in the following specification and accompanying sheets of drawings.

In the drawings:

Figure 1 is a side elevational view of the hoisting structure as used with a conventional trailer or wagon. The view shows in dotted lines the elevated position of the wagon and the tilted or rocked position of the hoists;

Figure 2 is a perspective view of the hoisting apparatus in its lowered position;

Figure 3 is an end elevational view of the lower portion of one end of the hoisting apparatus and illustrating the use of the means for elevating the end element with respect to the platform;

Figure 4 is a similar end elevational view showing the end element raised so that the platform structure may be used as a skid for transporting the hoist;

Figure 5 is a fragmentary view of an upper portion of one of the end elements, the view being taken generally on the line 5—5 of Figure 2;

Figure 6 is an enlarged sectional view taken on the line 6—6 of Figure 5;

Figure 7 is a sectional view taken on the line 7—7 of Figure 3;

Figure 8 is an enlarged sectional view taken on the line 8—8 of Figure 2;

Figure 9 is an enlarged sectional view taken on the line 9—9 of Figure 2;

Figure 10 is a schematic view of the drive means; and

Figure 11 is a view of the raising lever for conditioning the apparatus for transport.

The preferred embodiment of the invention disclosed herein comprises essentially three main elements: A platform structure 20 and a pair of opposite end elements or structures 22 and 24.

The platform structure preferably comprises a pair of elongated tubular members 26 and 28 rigidly cross-connected intermediate their ends by a bracing plate 30 and respectively provided with plates or ramps 32 and 34 (Figures 2 and 4). These ramps are spaced apart lengthwise of the platform structure so that a vehicle may be driven onto, off or over the platform structure. Such vehicle is designated by the letter V in Figure 1 and is typical of a conventional trailer or wagon used on farms. This vehicle has rear wheels R and front wheels F which support a conventional wagon box having front and rear ends, the rear end of which may be provided in any conventional manner with an endgate arranged for removal so that when the wagon is bodily tipped the contents thereof may be discharged into a hopper H. The tubular members 26 and 28 are spaced apart transversely a sufficient distance to receive a portion of the front wheels F (Figure 1). Since the ramps 32 and 34 are provided at opposite sides of the platform structure, the wagon may be drawn or moved onto the hoist from either side, as by a tractor or other draft vehicle. When the wagon is in position with its front wheels on the platform structure, the rear wheels may be blocked as at B (Figure 1).

The end portions of the members 26 and 28 at one end of the platform structure are turned upwardly and inwardly toward each other and are rigidly secured, as by welding, to a guide means in the form of a square or otherwise non-circular vertical sleeve 36. The other ends of the members 26 and 28 are similarly associated with a guide or sleeve 38.

The end element or structure 22 includes a plurality of components arranged to form generally an isoseles triangle of which the sides are preferably tubular frame members 40 and 42 and the base is an arcuate member 44 which is convex as respects the apex end of the triangular structure to provide a rocker the curved under surface of which is adapted to rest on the ground or a comparable support. In the present case, the support for the rocker is an elongated guide member in the form of a channel 46. This member is provided to prevent the rocker 44 from digging into the ground as the hoisting apparatus is used. It will be found that the channel need not be used where surface conditions are adequate.

The rocker member 44 is also preferably tubular in cross section and the lower ends of the side members 40 and 42 are curved and fitted into and welded to opposite ends of the member 44, as at 48 and 50, respectively. The apex ends of the members 40 and 42 are joined together by means including a cap 52 which is of hollow construction to embrace and enclose the apex ends of the members. These ends of the members are secured to and within the cap by bolts 54 and 56, respectively. The end structure 22 further includes a vertical or upright member 58 which comprises generally the altitude of the triangle. This member passes slidably through the guide sleeve 38 and is rigidly secured at its lower end to an intermediate point of the rocker 44. The upper end of the member 58 is rigidly secured in and enclosed by the cap 52, the securing means comprising a bolt 60. The member 58 is preferably square or otherwise non-circular in cross section to conform to the cross section of the guide sleeve 38. The guide sleeve is of sufficient vertical dimension to prevent displacement of the end structure 22 laterally with respect to the platform structure 20 and the end and platform structure are thus stabilized or interbraced solely by means of the connection between the sleeve 38 and member 58. Likewise, the cooperating cross sections of the member 58 and sleeve 38 prevent twisting of the end structure 22 about the vertical axis of the member or column 58. Hence, all the bracing structure between the end element 22 and platform structure 20 is confined to the end of the platform, leaving the platform otherwise unobstructed for the passage thereover of wagons or trailers.

The cap 52, in addition to tying together the upper ends of the members 40, 42 and 58, serves also as means for supporting a rotatable element in the form of a sheave 62. For this purpose, the cap 52 has extension walls 64 which embrace and at least partially enclose the sheave. These walls also include bearing portions 66 on which the sheave is rotatably carried. The cap itself provides a main enclosure for the upper ends of the members 40, 42 and 58 and the wall extensions 64 provide a secondary enclosure for the sheave. The cap 52 further includes an anchor element 68 for anchoring one end of a cable, which will be presently described.

The end structure 22 further includes a supporting member 70 which is spaced upwardly from the base or rocker 44 and which is secured at its opposite ends respectively to the members 40 and 42. In addition to serving as a structural part of the end element 22, the brace 70 further serves as means for supporting auxiliary equipment, the details of which will be set forth below.

The other end structure or element 24 is constructed in a fashion very similar to that of the end structure 22 and to this end has a pair of upwardly converging side members 72 and 74 and an arcuate base or rocker member 76. The members 72 and 74 are rigidly joined at curved lower ends thereof respectively to opposite ends of the rocker member 76, as by welding at 78 and 80. The upper or apex ends of the members 72 and 74 are rigidly joined by means including a cap 82, which is similar to the cap 52 except that it is not provided with a sheave. The cap 82, in addition to enclosing and joining the upper ends of the members 72 and 74, further provides securing means for a vertical or upright member or column 84 which corresponds to the column 58 in the end structure 22. The lower end of the column 84 is rigidly secured to an intermediate portion of the rocker 76 and passes through the sleeve 36. The relationship between the member 84 and sleeve 36 corresponds to that between the member 58 and sleeve 38 and the stabilizing or interbracing effect between the end structure 24 and the platform structure 20 is the same as that at the opposite end of the platform structure. A guide channel 86 is provided for supporting the rocker 76 on soft ground and corresponds to the guide channel 46 previously described. The cap 82 is provided with an anchor element 88 to which may be secured one end of cable means to be presently described.

In all fundamental respects, the end structures 22 and 24 are substantially identical. They are held in spaced apart relationship lengthwise of the platform structure 20 by means of the platform and the connections between the platform and the end structures. The guide means or sleeves 36 and 38 mount opposite ends of the platform structure 20 respectively on the vertical columns 84 and 58 so that the platform structure may be raised and lowered with respect to the end structures as the latter are sustained on the ground or other comparable supporting surface, either alone or through the intermediary of the channels 46 and 86. The platform structure itself constitutes the sole means for spacing the end structures 22 and 24 apart and, as previously described, the platform structure is thus unobstructed and trailers or wagons may be readily driven onto, off of or over the platform.

As previously described, the member 70 and the end structure 22 provide means for supporting auxiliary equipment for the hoisting apparatus. In the present case, the member 70 and the rocker member 44 cooperate to carry vertically therebetween a pair of spaced apart supports 90 and 92. These supports are provided with suitable bearings for journaling an upper shaft 94 and a lower shaft 96. Opposite ends of the lower shaft 96 project respectively in opposite directions at 98 and 100 to provide for connection thereto of power shafting from a remote power source, if desired. In the present case, the source of power is an internal combustion engine 102 which is mounted on a support 104 suitably carried by the upper member 70 and base or rocker member 44. The internal combustion engine may be easily removed in the event that it is desired to power the hoist by other means, as indicated generally in Figure 2.

Although, for the purposes of the present disclosure, it is unimportant just what type of power is used in the hoist, a brief description will be given of the drive illustrated in Figure 1. The internal combustion engine 102 includes an output shaft 106 on which is keyed a sprocket 108. This sprocket is connected by a driving chain 110 to a larger sprocket 112 journaled on the rear end of the upper shaft 94. This sprocket is rotatable with a pinion 114 which is in constant mesh with a larger gear 116 keyed to the lower shaft 96.

As illustrated schematically in Figure 10, the shaft 96 journals thereon adjacent the keyed gear 116 a cable-winding drum 117 to which is fixed a large driven gear 118. The gear 118 is in constant mesh with a pinion 119 that is journaled on the upper shaft 94. The pinion 119 is preferably an integral part of a larger coaxial gear 120 which is in constant mesh with a pinion 121 coaxial with the gear 118 and journaled on the shaft 96. The pinion 121 is preferably formed integral with a driven element 122 which has an outer brake surface 123 and an inner clutch face 124. A driving clutch element 125 is splined or otherwise mounted on the shaft 96 for rotation with the shaft and for axial sliding or shifting on the shaft. The clutch element 125 is provided with a clutch face 126 which is selectively engageable with or disengageable from the clutch face 124 on the driven element 122. The driving element 125 has a collar 127 under the control of a throw-out or control lever 128 which is pivoted at 129 on the support 90.

It will be seen from the description thus far that the shaft 96 is constantly rotated by the internal combustion engine 102, and, as long as the clutch elements 122 and 125 are disengaged, no power will be transmitted to the cable-winding drum 117 through the reduction gearing 121—120 and 119—118. When the clutch elements are engaged, power is transmitted from the shaft 96 through the element 122 and to the pinion 121. Since the pinion 121 is in constant mesh with the gear 120 and the pinion 119 rotates with the gear 120 and is in constant mesh with the gear 118, the cable-winding drum 117 will be driven. Driving of the drum 117 by the means just described causes the drum to wind a cable 132 for elevating the platform structure 20. Lowering of the platform structure is accomplished by disengaging the clutch 122—125 so that the platform structure and elevated wagon or trailer will descend by virtue of their own weight, thus unwinding the cable 132 and reversing rotation of the gearing 118—119 and 120—121. This cable 132 extends upwardly over the sheave 62, which is carried by the cap 52 at the upper end of the end structure 22, and then extends downwardly to pass under and around a sheave 134 and thence upwardly to have its end anchored by the element 68 on the cap 52 (Figures 2 and 5). The sheave 134 is mounted by means of a brackekt 136 on the guide sleeve 38. Since the guide sleeve is an integral part of the platform 20, winding of the cable 132 on the drum 117 will elevate the proximate end of the platform. In order that the raising and lowering means effected by the drum and cable 117—132 will be effective to operate on both ends of the platform structure, there is provided equalizing means in the form of a cable 138 which is connected at each of its opposite ends respectively to the end structures 22 and 24 and which cooperates with the platform structure 20.

As will be apparent from an examination of Figure 2, one end of the cable 138 is anchored at 140 to a lower portion of the end structure 22, preferably at the junction of the column 58 and rocker 44. The platform structure includes a plurality of sheaves 142, 144, 146 and 148 through and over which the cable 138 is reeved so that its opposite end passes upwardly to be anchored to the anchoring element 88 on the cap 82 at the upper end of the end structure 24. The sheave 142 is supported by a bracket 150 to an end portion of the member 28 of the platform structure 20 (Figure 9). The sheaves 144 and 146 are provided with brackets in the form of gusset plates 152 and 154, respectively (Figure 2). The sheaves 144 and 146 are respectively arranged at corner portions of the member 28, and these corner portions are cut out, so that the periphery of each sheave is intersected by the surface of the member 28, whereby the cable 138 may enter the tubular member 28 and pass therethrough intermediate the sheaves 144 and 146 and thence outwardly through the member 28 to the sheave 148. The sheave 148 is rotatably carried by bracket means 156 rigidly mounted at the junction of the member 28 and the end sleeve 36 (Figure 8). It will thus be seen that as the end of the platform structure 20 adjacent the application of power is raised by means of the cable 132, the result is that the distance between the sheave 142 and anchor element 140 tends to increase. Since the cable 138 cannot lengthen, the application of force to the one end of the platform structure is transmitted through the cable 138 to the other end of the platform, thereby equalizing the lifting effort on the platform.

As previously stated, the driving means includes the element 122 which has the brake surface 123. This braking surface is cooperative with a braking element in the form of a band or shoe 158 which is under control of the control lever 128. The shaft 94 is stationary and has pivoted thereto a brake arm 160 which carries the brake shoe 158. A control member 162 is rigidly secured to the brake arm 160 and extends generally parallel to the support member 70. A tension spring 164 is connected between the free end of the member 162 and a portion of the member 70 and functions to maintain engagement between the brake shoe 158 and the brake surface 123. Since minimum torque is transmitted at the pinion 121 as the gearing rotates reversely when the wagon and platform structure descend, the brake 123—158 may be of relatively small size.

The control arm 128 carries above its pivot point at 129 a pin 166 which engages an upper portion of the brake control arm 162. When the control lever is in its neutral position as shown in Figure 1, the brake control arm 162 is under action of the spring 164 and the brake is engaged. When the control lever 128 is swung in a counterclockwise direction about its pivot 129 (as viewed in Figure 1), the driving clutch element 125 is shifted to the right so that the clutch face 126 engages the clutch face 124 of the driven clutch element 122. Simultaneously, the arm or member 162 is depressed so that the brake is released. Drive is thus established between the shaft 96 and the cable-winding drum 117. This drive may be interrupted at any time by a release of the control lever 128 so that it may return to neutral and simultaneously apply the brake and disengage the clutch. In the present case, an automatic throw-out is effective to disengage the clutch and apply the brake when the platform structure 20 has reached a predetermined elevation. For this purpose, a throw-out rod 168 is provided, which extends vertically alongside the column 58 and has its upper end passing through an apertured plate 170 secured to the cap 52. The upper end of the rod is provided with a nut 172 to prevent displacement of the rod from the apertured plate 170. An adjustable stop 174 is provided on the rod and may be engaged by a cooperative stop in the form of a lug 176 at the upper end of the guide sleeve 38. The stops are interengageable after a predetermined upward movement of the guide sleeve 38 with respect to the column 58.

When the stop or lug 176 moves upwardly and engages the stop 174 on the rod 168, the rod 168 is shifted upwardly and operates through a bell crank 178 and shift rod 180 to return the control lever 128 in a clockwise direction to its neutral position, whereupon the clutch will become disengaged and the brake will be engaged. Lowering of the platform structure 20 and vehicle is accomplished by shifting the control lever 128 further in a clockwise direction beyond the position shown in Figure 1. This movement of the control lever 128 maintains disengagement of the clutch and releases the brake 158—123. Descent of the loaded platform structure may be slowed at any time by the operator by merely moving the control lever in a counterclockwise direction so that the brake will be applied or partially applied by the spring 164, all of which can be accomplished without engaging the clutch, since it takes maximum counterclockwise movement of the lever 128 to effect engagement of the clutch.

The driving means illustrated and described is but one form of such means that can be used to operate the hoist. As previously stated, the internal combustion engine may be dispensed with and the drive taken directly on the shaft 96 at either of the ends 98 or 100. In either event, the operation of the clutch and brake means will be the same as that described.

Portions of the gearing and of the clutch and brake mechanism may be enclosed by a shield 181, which is shown in place in Figure 2 but which is removed from the illustration in Figure 1.

In order that the guide means or channels 46 and 86 may be provided as attached parts of the end structures 22 and 24, respectively, each assembly is provided with attaching or retaining structure, the details of which are best shown in Figures 3, 4 and 7. The channel 86 is provided at each side and at longitudinally spaced portions thereof with an upstanding guide member, one being designated by the numeral 182 and the other by the numeral 184. These members are preferably welded to opposite sides of the channel 86. The member 184 has a longitudinal or upright slot 186 therein through which is passed a retaining bolt 188 (Figure 7). This bolt passes through a sleeve 190 which is welded or otherwise rigidly secured to an upper portion of the rocker member 76.

The member 182 is slotted at 192 to receive a bolt 194 which passes through a sleeve (not shown) similar to the sleeve 190. When the hoisting apparatus is set up for use in tilting a trailer or wagon, the bolts 194 and 188 are loosened so that they may move lengthwise of the slots as the end structure 24 rocks back and forth. The channel 46 at the opposite end structure 22 is provided with a pair of upstanding members 196 and 198 which are slotted to receive, respectively, bolts 200 and 202. The members 196 and 198 are associated with the rocker member 44 in the same manner as the members 182 and 184 are associated with the rocker member 76 of the end structure 24 and the function of these components is the same as those previously described.

It is an important feature of the present invention that the platform structure 20 may be utilized as skid means for facilitating the transport of the hoisting apparatus. For this purpose, it is desirable to elevate the end structures 22 and 24 with respect to the platform structure so that the former are clear of the ground. The means for so elevating the end structures 22 and 24 utilizes the equalizing means including the cable 138 and sheaves 142, 144, 146 and 148. Part of this elevating means includes a stud or member 204 fixed to a lower portion of the sleeve 36 for the end structure 24 (Figure 3). The extreme lower end of the column 84 is provided with a similar stud 206. When the apparatus has its components in normal operating position, the studs 204 and 206 are spaced apart the distance shown in Figure 3. When it is desired to elevate the end structures with respect to the platform structure, the studs 204 and 206 are moved closer together. This operation is accomplished by means of a raising lever designated generally by the numeral 208. The lever 208 has a handle 210 of sufficient length to give the required leverage. This handle is provided at one end thereof with an aperture 212 and with a rigid arm 214. A link 216 is pivoted at 218 to the free end of the arm 214 and the other end of the link 216 has an aperture 220 therein.

The use of the lever 208 is illustrated in Figures 3 and 4. The stud 204 receives the lever 208 via the aperture 212 and the stud 206 receives the aperture 220 in the link 216. The lever is then pivoted in a counterclockwise direction (as viewed in Figure 3) so that the stud 206 is brought closer to the stud 204, thus elevating the end structure 24. The design of the lever is such that it may lock in an over-center position (Figure 4). Since one stud is connected to the platform structure (via the sleeve 36) and the other is connected to the end structure 24 (via the rocker member 76), a downward force will be exerted on the platform structure and a corresponding upward force will be exerted on the end structure 24.

As the end structure 24 is elevated, it tends to tighten that portion of the cable 138 between the anchor element 88 and the lower sheave 144. Since the cable cannot increase in length, it exerts an upward force on the opposite end structure 22 by means of that portion of the cable 138 between the sheave 142 and the lower anchor element 140, thus elevating both end structures 22 and 24 simultaneously.

Inasmuch as the channels 46 and 86 are connected respectively to the end structures 22 and 24 by the means heretofore described, these channels will likewise be elevated. However, since the bolts (188, 194, 200 and 202) are loose, the channels 46 and 86 may not move upwardly in parallelism to the ground. However, the desired result can be achieved by tightening the bolts so that the channels occupy a position similar to that occupied by the channel 86 in Figure 4. The members 26 and 28, lying lengthwise of the platform structure 20, provide ideal skids so that the platform may be towed along the ground. Any suitable connection may be made at either end of the platform to an appropriate tow line.

It is believed that the operation and use of the apparatus will be apparent from the foregoing description. However, a brief description thereof may serve to emphasize certain important features of the apparatus. As will be apparent from an examination of Figure 1, elevation of the platform structure to elevate the front end of the vehicle V is accompanied by rocking of the entire apparatus toward the rear end of the wagon as the front portion of the wagon moves upwardly about the pivot at the axis of the rear wheels R. Since the rear wheels are blocked at B, the rear end of the wagon is not displaced relative to the hopper H. Further, since the front wheels F can drop in between the tubular members 26 and 28 the forward end of the wagon is prevented from becoming displaced from the platform structure. The rocker members are sufficiently long so that the stability of the apparatus is maintained regardless of the height to which the platform structure is elevated.

The apparatus may be readily raised and lowered by means of the control lever 128 and the clutch and brake means previously described. It will be noted that the clutch and brake means are coordinated so that the operator at all times has control of the apparatus. When the control lever is moved in a clockwise direction (as viewed in Figure 1), the brake is disengaged to allow the apparatus to descend by virtue of the weight of the platform structure and the vehicle thereon. Since the clutch is at this time disengaged, the reverse rotation of the gears 118, 119, 120 and 121 does not affect operation of the internal combustion engine 102. Similarly, in the event that the power means is driven at either 98 or 100, reverse rotation of the gearing just mentioned would not affect the shaft 96.

Various important features and objects of the invention not specifically enumerated above will undoubtedly occur to those versed in the art, as likewise will various modifications and alterations in the preferred form of the invention illustrated, all of which may be achieved without departing from the spirit and scope of the invention as defined in the appended claims.

What is claimed is:

1. Hoisting apparatus, comprising: a generally elongated, horizontal platform having opposite end portions and adapted normally to rest on the ground or a comparable surface; a pair of end elements spaced apart and disposed respectively at the end portions of the platform, each element including an upright column and a base member rigid with the column and extending transverse to the length of the platform, each base member having a curved under surface symmetrical at each side of the base member and providing a rocker for rocking of the element selectively and symmetrically in opposite directions in a generally vertical plane transversely of the platform; and a pair of guide means respectively interconnecting each column with the proximate end portion of the platform to connect the platform to the elements for vertical movement relative to the elements and for movement with the elements as the latter rock as aforesaid.

2. The invention defined in claim 1, further characterized in that each end element is generally in the form of an isoceles triangular structure in which the column is the altitude and opposite sides incline as braces downwardly toward opposite ends of the base member.

3. The invention defined in claim 1, further characterized in that: a pair of sheaves are spaced apart lengthwise of the platform respectively adjacent to the elements; and a cable is anchored at one end to an upper part of one column, is trained over said pair of sheaves and then anchored at its other end to a lower part of the other column.

4. The invention defined in claim 3, further characterized in that: the platform includes a hollow element extending lengthwise thereof between the sheaves of said pair; and the cable passes through said element.

5. Hoisting apparatus, comprising: a generally horizontal platform having opposite end portions; end elements respectively at said opposite end portions, each element including a base and an upright member, said bases respectively having convex under surfaces to provide for rocking of the elements in generally parallel, spaced apart planes respectively at opposite end portions of the platform; means guiding the platform for vertical movement up and down the upright members; means associated with the elements and the platform and operative to exert downward forces on the bases and upward forces on the platform to elevate the latter; a pair of carriers respectively for the bases and adapted to rest on the ground or other comparable support and having generally horizontal upper surfaces for facilitating rocking of the bases; and means interconnecting each carrier and its associated base and including a guide limiting relative displacement between the carrier and its base laterally of the plane of rocking, and means limiting vertical separation between the base and its carrier.

6. The invention defined in claim 5, further characterized in that: means is provided between the end elements and the platform and operative to exert a downward force on the platform, while the platform rests on the ground or other comparable support, and an upward force on the end elements to elevate the bases; and said last named limiting means provide for elevating the carriers along with the bases.

7. The invention defined in claim 6, further characterized in that: means is provided for each base and carrier for holding the carriers against rocking relative to the bases when said carriers and bases are elevated.

8. In hoisting apparatus including a platform and a base, each of which is normally separately sustained by the ground or other suitable support and wherein means is provided for exerting a downward force on the base and an upward force on the platform to elevate the platform: the improvement comprising means for exerting a downward force on the platform and an upward force on the base, including a first reacting member fixed to the base; a second reacting member fixed to the platform; lever means engageable with said members and movable about the second member as a fulcrum to elevate the first member and consequently the base.

9. The invention defined in claim 8, further characterized in that: the lever means includes a pair of jointed parts providing a toggle.

10. The invention defined in claim 8, further characterized in that: the lever means includes a bell crank having a relatively long lever arm and a short lever arm and an aperture at the junction of said arms for connection to the second reacting member, and a link jointed to the short arm and having an aperture for connection to the first reacting member.

11. The invention defined in claim 10, further characterized in that: the lever means has an over-center lock utilizing said link, said short arm and the reacting members.

12. Housing apparatus, comprising a generally horizontal, normally ground-supported elongated platform structure having opposite ends; a pair of end elements respectively at said opposite ends of the platform structure, each element including a rigid column and ground-engaging base means rockably carrying the associated column in balanced relationship to a vertical neutral position and for swinging of said associated column selectively and symmetrically to either side of and return automatically to said vertical neutral position, each column being joined to its base means so as to prevent relative twisting between the column and its base means about the principal axis of the column; each base means being structurally separate from the other base means and each column having a free upper end portion structurally separate from the free upper end portion of the other column; a pair of interconnecting means respectively interconnecting the end portions of the platform structure and the columns so that the platform structure and the columns may swing and return as aforesaid as a unit; each of said interconnecting means being connected to the associated end of the platform structure against lateral displacement relative to said platform structure and including a sleeve-like member vertically slidably embracing its associated column at points spaced sufficiently far apart vertically to prevent lateral displacement of the associated column and thereby to join the columns for swinging and return in unison in parallel upright planes and to interbrace the columns against displacement relative to each other and relative to the platform structure in directions transverse to said planes while enabling the platform structure to be bodily moved vertically relative to the end elements and the interconnecting means being respectively rigid with the ends of the platform structure and respectively engaging the columns for restraining the columns against twisting about their principal axes relative to each other and relative to the platform structure.

13. The invention defined in claim 12, further characterized in that: each column includes an integral vertical portion of non-circular cross-section; and each interconnecting means includes a non-circular element secured to the proximate end of the platform structure and slidably embracing the non-circular section of the associated column.

(References on following page)

References Cited in the file of this patent

UNITED STATES PATENTS

| | | |
|---|---|---|
| 620,585 | Hayes | Mar. 7, 1899 |
| 820,249 | Otto | May 8, 1906 |
| 909,281 | Camp | Jan. 12, 1909 |
| 956,507 | Adams | May 3, 1910 |
| 1,049,210 | Cole | Dec. 31, 1912 |
| 1,128,625 | Poulnot | Feb. 16, 1915 |
| 1,170,876 | Calhoun | Feb. 8, 1916 |
| 1,255,313 | Hurst et al. | Feb. 5, 1918 |
| 1,302,797 | Hedstrom | May 6, 1919 |
| 2,282,621 | Thompson | May 12, 1942 |
| 2,349,911 | Neighbour et al. | May 30, 1944 |
| 2,614,710 | Gregory | Oct. 21, 1952 |